United States Patent [19]

Ruiz-Avila

[11] Patent Number: 4,573,278

[45] Date of Patent: Mar. 4, 1986

[54] APPARATUS FOR THE DEHYDRATION OF ORGANIC MATERIAL

[75] Inventor: Jose L. Ruiz-Avila, Palmwoods, Australia

[73] Assignee: AKT Consultants Pty, Limited, Queensland, Australia

[21] Appl. No.: 737,904

[22] PCT Filed: Jan. 14, 1983

[86] PCT No.: PCT/AU83/00004

§ 371 Date: Sep. 19, 1983

§ 102(e) Date: Sep. 19, 1983

[87] PCT Pub. No.: WO83/02495

PCT Pub. Date: Jul. 21, 1983

Related U.S. Application Data

[63] Continuation of Ser. No. 537,414, Sep. 19, 1983, abandoned.

[30] Foreign Application Priority Data

Jan. 19, 1982 [AU] Australia .............................. PF2335

[51] Int. Cl.$^4$ ............................................. F26B 17/12
[52] U.S. Cl. ......................................... 34/168; 34/171
[58] Field of Search .................. 34/168, 171, 178, 231

[56] References Cited

U.S. PATENT DOCUMENTS 3,638,331  2/1972  Steffen .................................. 34/231
3,913,469 10/1975  Arnold .................................. 34/168
4,249,891  2/1981  Noyes et al. ......................... 34/171

FOREIGN PATENT DOCUMENTS 4963 11/1931  Australia .
  236849  3/1959  Australia .
  437015  6/1973  Australia .
  475396  8/1976  Australia .
  981750  1/1965  United Kingdom .

Primary Examiner—Albert J. Makay
Assistant Examiner—Steven E. Warner
Attorney, Agent, or Firm—Oblon, Fisher, Spivak, McClelland & Maier

[57] ABSTRACT

Dehydration tower (22) for previous agitated organic material carried by a heated air stream, the tower containing a selectively rotatable series of baffles (42, 43, 44, 45) for varying the path length of the material, and thus the residence time, in the tower, as the material passes up the tower on one side of the vertical series of baffles (49) and then down the other side of the series.

16 Claims, 14 Drawing Figures

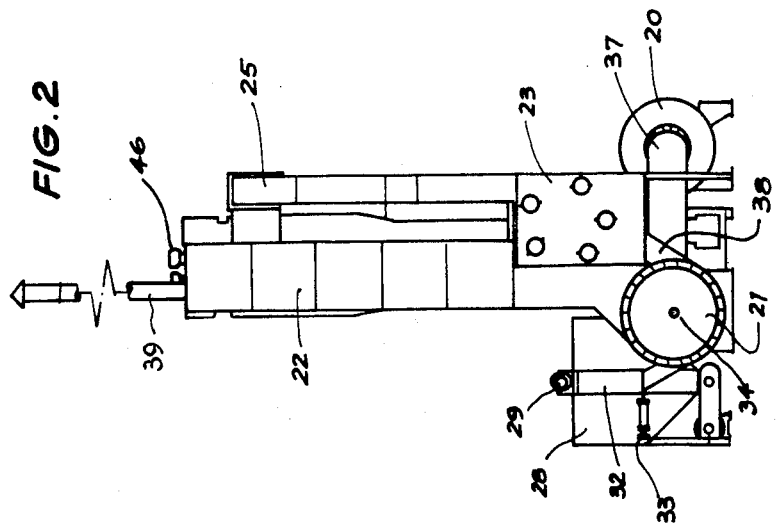
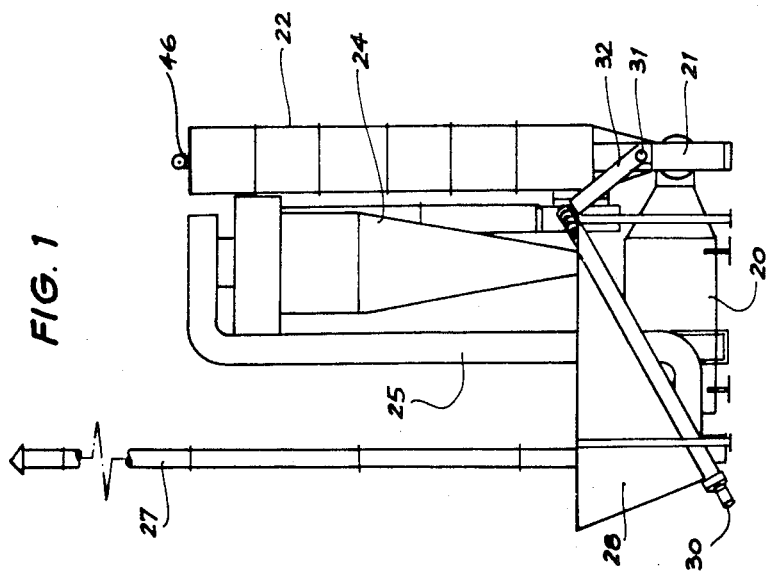

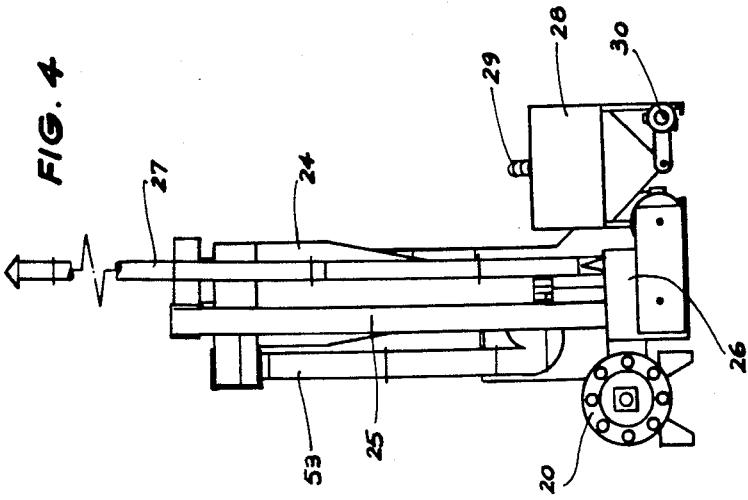
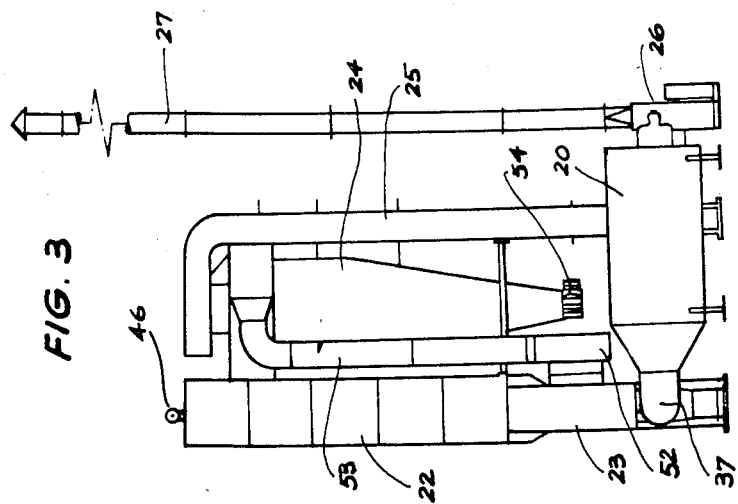

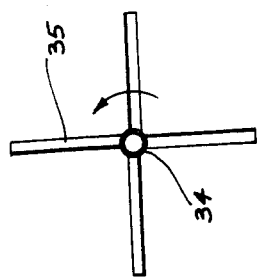
FIG. 6
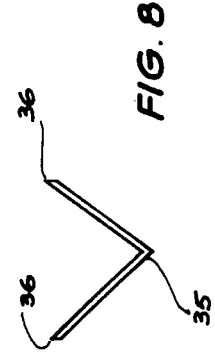
FIG. 7
FIG. 8
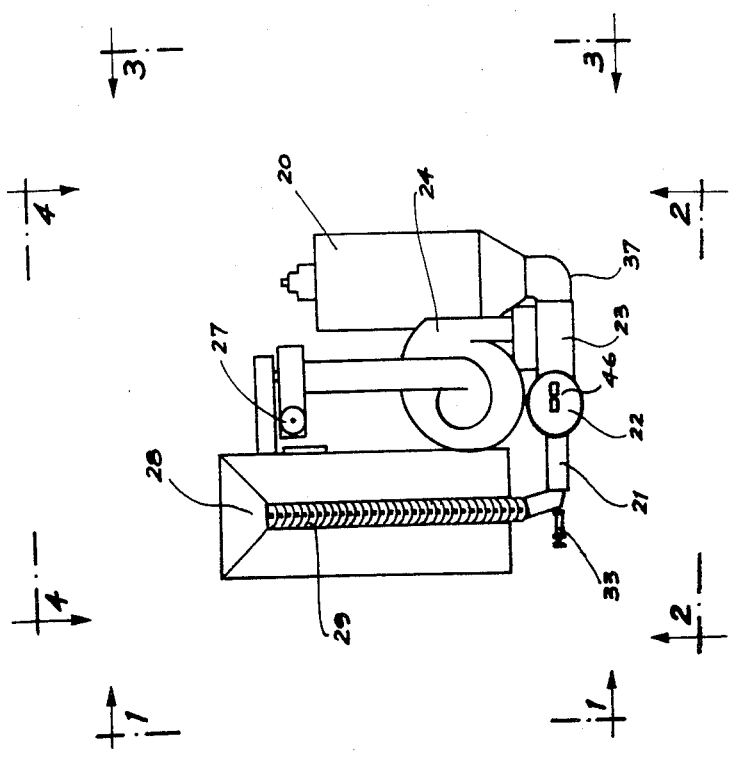
FIG. 5

APPARATUS FOR THE DEHYDRATION OF ORGANIC MATERIAL

This application is a continuation of application Ser. No. 537,414, filed Sept. 19, 1983, now abandoned.

TECHNICAL FIELD

This invention relates to apparatus for the dehydration of organic material, of the type in which such material is passed from an agitating chamber and through inlet and outlet paths of a dehydrating tower by means of a stream of heated air. Such apparatus is used in the production, for example, of fish meal, and the production of dehydrated meal from varioius organic raw materials such as meat products, waste materials from poultry and fish processing.

BACKGROUND ART

Apparatus of the type referred to is well known in the art, and generally comprises means for the supply of raw material and heated air to an agitator in which the material is partially comminuted and dried until its density is such that it is carried upwardly into a dehydrating tower where final dehydration takes place, the fully treated material being recovered from the air stream beyond the tower by suitable means such as a cyclone.

DISCLOSURE OF INVENTION

Equipment of this type known in the prior art suffers from the disadvantage of being incapable of ready adaptation to different types of feed material, and to feed material of different quality. The object of the present invention is to provide dehydrating apparatus which offers greater flexibility in this regard, by providing apparatus in which the residence time of material within the dehydrator may readily be altered, even during continuous operation.

The invention broadly comprises apparatus for the dehydration of organic material in which such material is passed from an agitating chamber, which may also provided for comminution of the material, and through inlet and outlet paths of a dehydrating tower by means of a stream of heated air, characterized in that the tower comprises means for varying the length of the path of the material therein, thereby to vary the residence time of the material in the tower.

In the preferred embodiment of the invention, the material passes upwardly in the tower and then downwardly on either side of a series of baffles, which may be selectively rotated to vary the height of the path through the tower.

BRIEF DESCRIPTION OF THE DRAWINGS

In the accompanying drawings;

FIG. 1 is a rear elevation of a dehydrator embodying the present invention, from the direction 1—1 of FIG. 5;

FIG. 2 is a side elevation of the dehydrator in the direction 2—2 of FIG. 5;

FIG. 3 is a front elevation of the dehydrator in the direction 3—3 of FIG. 5;

FIG. 4 is a side elevation of the dehydrator in the direction 4—4 of FIG. 5;

FIG. 5 is a plan view of the dehydrator;

FIG. 6 is an end elevation of agitator blades employed in the dehydrator of FIGS. 1 to 5;

FIG. 7 is a plan view of the agitator blades of FIG. 6;

FIG. 8 is an end view of an agitator blade;

BEST MODE FOR CARRYING OUT THE INVENTION

Figure 9:
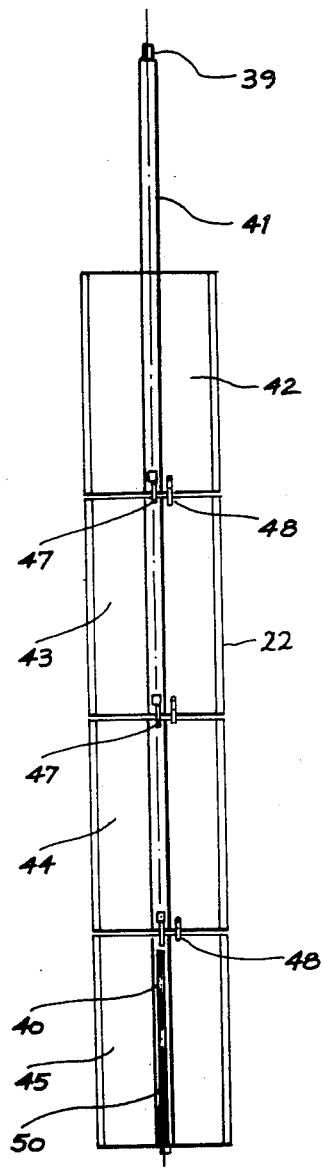
FIG. 9 is an elevation of the baffles employed in the dehydrator of FIGS. 1 to 8.
Figure 10:
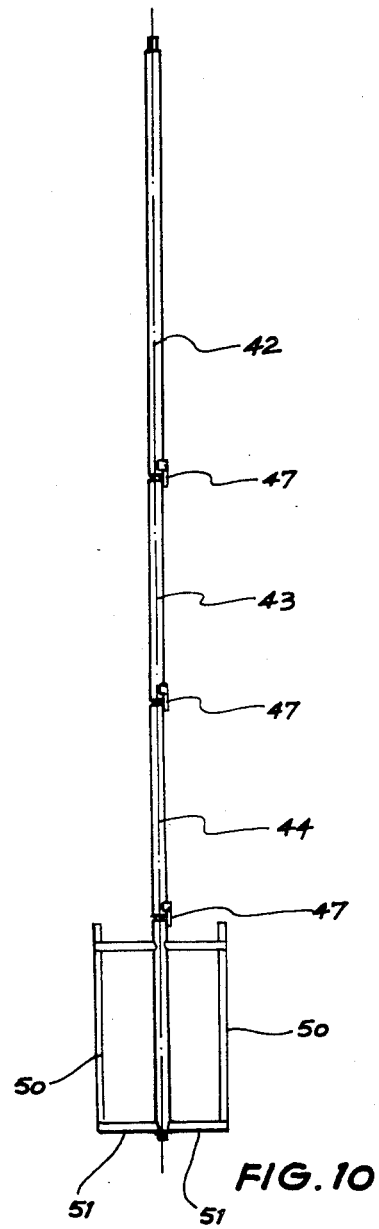
FIG. 10 is a further elevation of the baffles.

The illustrated dehydrator comprises a burner 20 which may be fed with oil or other suitable fuel, to provide by means of a blower (not shown) a stream of hot air to an agitator at 21. The pneumatic flow through the apparatus continues from the agitator 21 via a dehydrating tower 22, a classifier 23, a cyclone 24, exhaust duct 25, an exhaust fan 26 and a flue 27.

Organic material is supplied to the dehydrator from a bin 28 via a screw conveyor 29 driven by a motor 30 to the agitator 21 through a gate 31.

As is well known in the prior art, pneumatic flow through the dehydrator is determined both by the blower of the burner 20, and the partial vacuum produced by the exhaust fan 26.

The operation of the illustrated dehydrator will now be described in more detail, including those features which exemplify the novel characteristics of the present invention .

Raw material from the conveyor 29 falls through a chute 32 to the gate 31, and thence to the interior of the agitator 21. The gate 31 is controlled by means of a solenoid 33 which is controlled in response to the load on the agitator 21, sensed by means of a current transformer in the supply circuit of the agitator motor (not shown). In this way, a controlled and constant supply of feed is maintained within the agitator 21.

Rotating within the cylindrical housing of the agitator 21 on a shaft 34 are two sets of arms 35 (FIGS. 6, 7 and 8). Each set comprises four arms equally disposed about the shaft 34, and each arm comprises a pair of blades disposed to form a V-shaped cross-section as shown in the end view of FIG. 8, with the free edges of the blades providing sharp cutting edges 36. As the arms 35 rotate within the agitator 21, the material is constantly thrown around and comminuted by the cutting edges 36. Rapid comminution is achieved by the presence of two cutting edges on each arm, and the V-shaped cross-section of the arms facilitates the capture and agitation of the material.

Hot air is supplied to the agitator 21 from the burner 20 through the duct 37, and this is augmented by hot air supplied from the classifier 23 through the duct 38 as referred to below.

As the material is comminuted and dried within the agitator 21, its density falls until it reaches a level which is such that the head pressure within the tower 22 allows the material to rise with the flow of hot air into the tower 22.

The tower 22 is cylindrical in shape, and is provided with a central vertical shaft 39 (see FIG. 9). Mounted for rotation on the shaft 39 by means of collars 40 and 41 are a vertically disposed series of baffles 42, 43, 44 and 45. Each of the collars 40 and 41 may rotate independently on the shaft 39, and the topmost collar 41 is coupled with an electric motor 46.

Extending downwardly below the lower edge of each of the baffles 42, 43 and 44, are pairs of lugs 47 and 48 respectively located at positions spaced by 90° in relation to the shaft 39. These lugs extend to a point below the upper edge of the underlying baffle, to engage that baffle as the baffle to which they are attached rotates, as described below.

Figures 12, 13, 14:
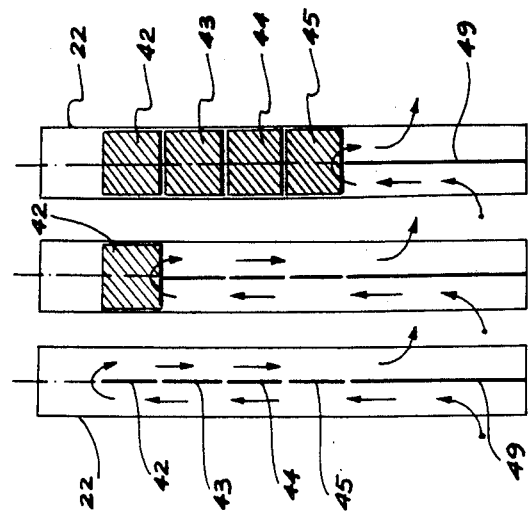
FIGS. 12, 13 and 14 show schematically the baffles in various positions.
Figure 11:
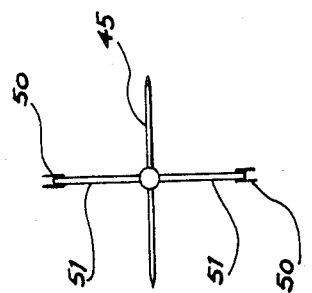
FIG. 11 is a plan view of the baffle assembly.

The baffles 42 through 45 function to define the inlet and outlet paths for the hot air and dehydrated material within the tower 22 as shown schematically in FIGS. 12, 13 and 14, the lowermost portion of the inlet and outlet flow being defined by a fixed baffle 49.

When the baffles are in the position as shown in FIG. 12, hot air and partially dehydrated material enters the tower from the agitator 21 and passes upwardly on the lefthand side (as viewed in FIG. 12) of the fixed baffle 49 and the movable baffles 42 through 45, to pass over the baffle 42 and downwardly to exit from the tower at its lower end on the outlet side of the fixed baffle 49. The motor 46 is arranged to drive the collar 41 in successive quadrants of rotation. Actuation of the motor 46 to move the collar 41 through its first quadrant will cause the baffles to adopt the configuration shown in FIG. 13, with the upper baffle 42 rotated through 90° to a position where it no longer influences the air flow through the tower, shortening the passage through the tower and, therefore, the residence time of the feed material. When the motor 46 is actuated to rotate the collar 41 through a further quadrant, the lug 47 of the baffle 42 will engage with the baffle 43, rotating it through 90° so that the path through the tower will be further shortened. Continued operation of the motor 46 will ultimately place the baffles in the position shown in FIG. 14, where the minimum path length and minimum residence time is determined by the fixed baffle 49.

Reversal of the motor 46 and continued operation through its quadrants of movement will return the baffles to the maximum residence time condition illustrated in FIG. 12, as the lugs 48 successively engage underlying baffles.

In this way, in a typical installation employing a 4 meter tower, the residence time of product within the tower can be varied between 0.5 seconds and 4 seconds. Of course, with greater tower heights, longer residence times can be achieved.

The baffles 42 through 45 provide three functions within the tower. They divide the air flow within the single tubular tower, they enable the pneumatic head of the tower to be varied, and also the rotation of the baffles, particularly during their return to the maximum path length condition, permits the clearing from the tower wall of any material which may adhere thereto.

This clearing function may be assisted by the provision of scraping blades 50, mounted on arms 51 disposed at right angles to the lower most baffle 45.

Air flow and entrained dehydrated material passes from the tower outlet to the classifier 23, which functions to separate air strata of differing densities in a manner well known in the prior art and not, therefore, described here. The classifier splits the air stream into a stream of hot unsaturated air which is returned to the agitator 21 by the duct 38, and a second stream which contains saturated air and the dried solids, this stream being extracted through a manifold 52. If desired, the classifier may be adjusted to direct solids back to the agitator 21 for further drying.

The dried solids and saturated air stream pass from the manifold 52, upwardly through a duct 53 to the cyclone 24. Dried solids are removed from the cyclone 24 at an air lock 54, while saturated air passes from the cyclone, through the duct 25 to the exhaust fan 26, whence it is discharged to atmosphere by means of the flue 27.

As in prior art dehydrators, the heat input may be varied by control of the burner 20, and this combined with the great flexibility of residence time achieved by the adjustable baffles, enables the dehydrator of the present invention to operate satisfactorily with a great range of raw material without extensive modification, as would be required in the prior art.

While the invention has been described herein in relation to its preferred mode of realisation, it will be appreciated that the general principles of novelty which have been disclosed are capable of application in other ways, and the invention is not, therefore, to be regarded as restricted by the particularity of the preceding description.

For example, instead of mounting the baffles for rotation about a vertical axis, the baffles may be mounted on individual horizontal axis. Other arrangements whereby the baffles may be successively rendered inoperative will be apparent to the skilled reader.

I claim:

1. Apparatus for the dehydration of organic material in which the material is passed from an agitating chamber and through a dehydrating tower by means of a stream of heated air, said apparatus characterized in that:
    (a) said tower includes therein substantially upright baffle means defining on respective opposite sides thereof first and second paths for the material, the arrangement being such that substantially all of the material introduced into said tower is passed by the stream of heated air upwardly along said first path and downwardly along said second path;
    (b) said substantially upright baffle means comprises a series of vertically disposed baffles mounted one above the other;
    (c) said vertically disposed baffles may be aligned in a common plane such that the stream of heated air passes upwardly along said first path on one side of said plane, above the highest baffle in said series of vertically disposed baffles, and downwardly along said second path on the other side of said plane;
    (d) at least some of said vertically disposed baffles are mounted so as to be individually movable out of said plane to vary the effective height of said substantially upright baffle means such as to allow the passage of the stream of heated air from said one side to said other side of said plane at selected locations below the upper edge of said highest baffle;
    (e) driving means associated with said movable, vertically disposed baffles, said driving means being actuable to a first extent to move said highest baffle out of said plane to an inoperative position so that the effective height of said substantially upright baffle means and the height of said path of the material is determined by the second highest baffle in said series of movable, vertically disposed baffles; and
    (f) said driving means is actuable to a second extent to cause movement of said second highest baffle out of said plane to an inoperative position so that the effective height of said substantially upright baffle means and the height of said path of the material is determined by the third highest baffle in said series of movable, vertically disposed baffles.

2. Apparatus according to claim 1 wherein said agitating chamber includes an agitator having a plurality of arms mounted radially on a rotating shaft, each said arms comprising a pair of parallel blades, said blades being mutually obliquely disposed to present a V-shape in cross-section parallel to said shaft, the free edges of said blades comprising cutting edges directed in the direction of rotation of said shaft.

3. Apparatus according to claim 1 wherein at least said first path has a substantially constant cross-section.

4. Apparatus according to claim 1 wherein said movable, vertically disposed baffles are mounted for rotation about a substantially vertical axis.

5. Apparatus according to claim 1 wherein further actuation of said driving means causes movement of further baffles in said series of movable, vertically disposed baffles out of said plane to inoperative positions so that the effective height of said substantially upright baffle means and said path is determined by the highest one of said baffles in said series of movable, vertically disposed baffles disposed in said plane below said inoperatively positioned one of said movable, vertically disposed baffles.

6. Apparatus according to claim 5 wherein each one of said movable, vertically disposed baffles is adapted for engagement with the next lower one of said movable, vertically disposed baffles in said series of movable, vertically disposed baffles so that said next lower one of said movable, vertically disposed baffles is caused to move out of said plane to an inoperative position when the next higher one of said movable, vertically disposed baffles is moved by said driving means beyond a predetermined extent.

7. Apparatus for the dehydration of organic material in which the material is passed from an agitating chamber and through inlet and outlet paths of a dehydrating tower by means of a stream of heated air, said apparatus characterized in that:
(a) said tower comprises means for varying the length of the path of said material therein, thereby to vary the residence time of said material in said tower;
(b) said stream passes upwardly in said tower and then downwardly to exit therefrom;
(c) the path of said stream is defined by a series of vertically disposed baffles mounted within said tower;
(d) said baffles may be aligned in a common plane between the entry and exit of said stream, such that said path proceeds upwardly on one side of said plane, above the highest baffle, and downwardly to said exit on the other side of said plane;
(e) said baffles are so mounted as to be individually movable out of said plane;
(f) the apparatus further comprises driving means associated with said baffles, said driving means being actuable to a first extent to move the highest baffle out of said plane to an inoperative position so that the height of said stream is defined by the second highest baffle; and
(g) actuation of said driving means to a second extent causes movement of the second highest baffle out of said plane to an inoperative position so that the height of said path is determined by the third highest baffle.

8. Apparatus for the dehydration of organic material, said apparatus comprising:
(a) an agitating chamber;
(b) a dehydrating tower;
(c) first means for passing a stream of heated air which carries the organic material to be dehydrated through said agitating chamber and, subsequently, through said dehydrating tower;
(d) at least three vertically disposed baffles mounted sequentially one above the other in said dehydrating tower, each of said baffles extending across the interior of said dehydrating tower so as to divide said dehydrating tower into two spaced vertical flow paths, at least the upper two of said at least three vertically disposed baffles being movable about a vertical axis within said dehydrating tower between a first position in which each one of said at least the upper two of said at least three vertically disposed baffles aligns with the next lower one of said vertically disposed baffles in edge-to-edge relationship and a second position in which each one of said at least the upper two of said at least three vertically disposed baffles is out of alignment with the next lower one of said vertically disposed baffles; and
(e) second means interconnecting at least the upper two of said at least three vertically disposed baffles such that the uppermost one of said vertically disposed baffles can be moved in a first direction from its first position to its second position without moving the next lower one of said vertically disposed baffles, but further movement of the uppermost one of said vertically disposed baffles in said first direction causes the next lower one of said vertically disposed baffles to move to its second position, while reverse movement of the uppermost one of said vertically disposed baffles first causes the next lower one of said vertically disposed baffles to move back to its first position without causing the uppermost one of said vertically disposed baffles to do so, and further reverse movement of the uppermost one of said vertically disposed baffles causes the uppermost one of said vertically disposed baffles to move back to its first position,
whereby the length of the path of the organic material to be dehydrated through said dehydrating tower can be varied, thereby varying the residence time of the organic material in said dehydrating tower.

9. Apparatus as recited in claim 8 wherein:
(a) the interior of said dehydrating tower is cylindrical;
(b) the movement of said vertically disposed baffles in both directions is rotational; and
(c) said second means comprises two lugs depending downwardly from the uppermost one of said vertically disposed baffles in position to engage the next lower one of said vertically disposed baffles, said lugs being spaced from each other by 90°,
whereby the first and second positions of said vertically disposed baffles are at right angles to each other.

10. Apparatus for the dehydration of organic material in which the material is passed from an agitating chamber and through a dehydrating tower by means of a stream of heated air, said apparatus characterized in that:
(a) said tower includes therein substantially upright baffle means defining on respective opposite sides thereof first and second paths for the material, the arrangement being such that the substantially all of the material introduced into said tower is passed by the stream of heated air upwardly along said first path and downwardly along said second path;
(b) said substantially upright baffle means comprises a series of vertically disposed baffles mounted one above the other;
(c) said vertically disposed baffles may be aligned in a common plane such that the stream of heated air passes upwardly along said first path on one side of said plane, above the highest baffle in said series of vertically disposed baffles, and downwardly along said second path on the other side of said plane;
(d) at least some of said vertically disposed baffles are capable of movement to vary the effective height of said substantially upright baffle means such as to allow the passage of the stream of heated air from said one side to said other side of said plane at selected locations below the upper edge of said highest baffle; and
(e) blade means associated with said vertically disposed baffles, said blade means being adapted on movement of said vertically disposed baffles to cooperate with the walls of said tower to clear adhering material therefrom.

11. Apparatus according to claim 10 wherein said vertically disposed baffles are mounted for rotation about a substantially vertical axis.

12. Apparatus for the dehydration of organic material in which the material is passed from an agitating chamber and through inlet and outlet paths of a dehydrating tower by means of stream of heated air, said apparatus characterized in that:
(a) said stream passes upwardly in said tower and then downwardly to exit therefrom;
(b) the path of said stream is defined by a baffle assembly mounted within said tower;
(c) said baffle assembly includes a series of vertically disposed, substantially imperforate baffles mounted one above the other;
(d) said baffles may be aligned in a common plane in adjacent edge-to-edge relationship to define a substantially planar, substantially imperforate baffle wall between the entry and exit of said stream such that said stream proceeds from said entry upwardly along said inlet path on one side of said planar baffle wall, above the highest baffle in said planar baffle wall, and downwardly along said outlet path on the other side of said planar baffle wall to said exit;
(e) at least some of said baffles are mounted so as to be movable to an inoperative position away from said adjacent edge-to-edge relationship to vary the effective height of said planar baffle wall so that said stream passes from one side to the other side of said planar baffle wall at a position determined by the highest baffle in said planar baffle wall disposed beneath said inoperatively positioned baffle or baffles,
whereby the length of the path of said stream and the and the residence time of the material in said tower can be selectively varied.

13. Apparatus according to claim 12 and further including driving means associated with said baffles, said driving means being actuable to move a selected one of said baffles between said adjacent edge-to-edge relationship and said inoperative position.

14. Apparatus according to claim 13 wherein each of said vertically disposed, substantially imperforate baffles is mounted for rotation about a substantially vertical axis.

15. Apparatus for the dehydration of organic material, said apparatus comprising:
(a) an agitating chamber;
(b) a dehydrating tower;
(c) first means for passing a stream of heated air which carries the organic material to be dehydrated through said agitating chamber and, subsequently, through said dehydrating tower;
(d) at least three vertically disposed baffles mounted sequentially one above the other in said dehydrating tower, each of said baffles extending across the interior of said dehydrating tower so as to divide said dehydrating tower into two spaced vertical flow paths, at least the upper two of said at least three vertically disposed baffles being movable about a vertical axis within said dehydrating tower between a first position in which both said baffles are aligned with the lowermost one of said vertically disposed baffles so as to provide fluid communication between the spaced vertical flow paths above the uppermost one of said aligned baffles and a second position in which either one of said at least the upper two of said at least three vertically disposed baffles is out of alignment with the lowermost one of said vertically disposed baffles to vary the position of fluid communication between said flow paths; and
(e) second means interconnecting at least the upper two of said at least three vertically disposed baffles such that the uppermost one of said vertically disposed baffles can be moved in a first direction from its first position to its second position without moving the next lower one of said vertically disposed baffles, but further movement of the uppermost one of said vertically disposed baffles in said first direction causes the next lower one of said vertically disposed baffles to move to its second position, while reverse movement of the uppermost one of said vertically disposed baffles first causes the next lower one of said vertically disposed baffles to move back to its first position without causing the uppermost one of said vertically disposed baffles to do so, and further reverse movement of the uppermost one of said vertically disposed baffles causes the uppermost one of said vertically disposed baffles to move back to its first position,
whereby the length of the path of the organic material to be dehydrated through said dehydrating tower can be varied, thereby varying the residence time of the organic material in said dehydrating tower.

16. Apparatus as recited in claim 15 wherein:
(a) the interior of said dehydrating tower is cylindrical;
(b) the movement of said vertically disposed baffles in both direction is rotational; and
(c) said second means comprises two lugs depending downwardly from the uppermost one of said vertically disposed baffles in position to engage the next lower one of said vertically disposed baffles, said lugs being spaced from each by 90°,
whereby the first and second positions of said vertically disposed baffles are at right angles to each other.

* * * * *